(12) United States Patent
Matsuno et al.

(10) Patent No.: US 7,572,552 B2
(45) Date of Patent: Aug. 11, 2009

(54) NONAQUEOUS ELECTROLYTE SECONDARY BATTERY

(75) Inventors: Shinsuke Matsuno, Kashiwa (JP); Tatsuoki Kohno, Tokyo (JP); Takao Sawa, Yokohama (JP); Norio Takami, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 656 days.

(21) Appl. No.: 10/825,437

(22) Filed: Apr. 16, 2004

(65) Prior Publication Data

US 2004/0258993 A1    Dec. 23, 2004

(30) Foreign Application Priority Data

Apr. 17, 2003  (JP)  ............................. 2003-113190
Sep. 26, 2003  (JP)  ............................. 2003-336246

(51) Int. Cl.
*H01M 4/38* (2006.01)
(52) U.S. Cl. .................................... 429/223; 429/231.5
(58) Field of Classification Search ........................ None
See application file for complete search history.

(56) References Cited

U.S. PATENT DOCUMENTS 6,265,111 B1    7/2001    Bito et al.

FOREIGN PATENT DOCUMENTS

| JP | 2001-93524 | * | 4/2001 |
| JP | 2001-250541 | | 9/2001 |
| JP | 2003-197188 | | 7/2003 |

OTHER PUBLICATIONS

U.S. Appl. No. 11/282,837, filed Nov. 21, 2005, Matsuno, et al.
U.S. Appl. No. 11/432,402, filed May 12, 2006, Matsuno, et al.
U.S. Appl. No. 11/509,754, filed Aug. 25, 2006, Matsuno, et al.
Yinghong Zhuang, Haixia Deng, Jingqi Liu, Qingrong Yao, The 673 K isothermal section of the LA-Ni-Sn ternary system, Journal of Alloys and Compounds 363 (2004) 223-226, Received Feb. 3, 2003; received in revised form Apr. 28, 2003; accepted Apr. 28, 2003.

* cited by examiner

*Primary Examiner*—John S Maples
(74) *Attorney, Agent, or Firm*—Oblon, Spivak, McClelland, Maier & Neustadt, P.C.

(57) ABSTRACT

The present invention provides a nonaqueous electrolyte secondary battery including a positive electrode, a negative electrode and a nonaqueous electrolyte. The negative electrode contains an alloy having a $CeNiSi_2$ type crystal structure.

8 Claims, 6 Drawing Sheets

NONAQUEOUS ELECTROLYTE SECONDARY BATTERY

CROSS-REFERENCE TO RELATED APPLICATIONS

This application is based upon and claims the benefit of priority from the prior Japanese Patent Applications No. 2003-113190, filed Apr. 17, 2003; and No. 2003-336246, filed Sep. 26, 2003, the entire contents of both of which are incorporated herein by reference.

BACKGROUND OF THE INVENTION

1. Field of the Invention

The present invention relates to a nonaqueous electrolyte secondary battery.

2. Description of the Related Art

In recent years, a nonaqueous electrolyte battery using lithium as the negative electrode active material attracts attention as a high energy density battery, and a primary battery using, for example, manganese dioxide ($MnO_2$), carbon fluoride [$(CF_2)_n$], or thionyl chloride ($SOCl_2$) as the positive electrode active material are already in wide use as a power source for desk-top computers, watches, and as memory back-up batteries. Further, with progress achieved in recent years in miniaturization and weight reduction in various electronic appliances such as VTRs and communication appliances, the demands have been increased for a secondary battery having a high energy density for use as the power source for such appliances. Much research is thus being conducted on a lithium secondary battery using lithium as the negative electrode active material.

Specifically, research is being conducted on a lithium secondary battery comprising a negative electrode containing lithium, an electrolyte selected from the group consisting of a nonaqueous electrolysis solution and a lithium conductive solid electrolyte, and a positive electrode containing as a positive electrode active material a compound capable of carrying out a topochemical reaction with lithium. Incidentally, the nonaqueous electrolysis solution used is prepared by dissolving a lithium salt such as $LiClO_4$, $LiBF_4$ or $LiAsF_6$ in a nonaqueous solvent such as propylene carbonate (PC), 1,2-dimethoxy ethane (DME), γ-butyrolactone (γ-BL) or tetrahydrofuran (THF). Compounds capable of carrying out a topochemical reaction with lithium include $TiS_2$, $MOS_2$, $V_2O_5$, $V_6O_{13}$, and $MnO_2$.

However, the lithium secondary battery outlined above has not yet been put in to practical use. It should be noted in this connection that lithium used in the negative electrode is pulverized after the secondary battery is repeatedly subjected to the charge-discharge operation. As a result, the lithium is converted into a highly-reactive lithium dendrite, which impairs the safety of the secondary battery. Also, related damage, short-circuiting and thermal runaway of the battery tend to be brought about. In addition, the charge-discharge efficiency is lowered, which shortens the cycle life. Such being the situation, the lithium secondary battery outlined above has not yet been put into practical use.

Under the circumstances, it is proposed to use a carbonaceous material capable of absorbing-desorbing lithium, such as coke, a baked resin, a carbon fiber or a vapor-grown carbon in place of the metal lithium. The lithium ion secondary battery that has been commercialized in recent years comprises a negative electrode containing a carbonaceous material, a positive electrode containing $LiCoO_2$, and a nonaqueous electrolyte. In this lithium ion secondary battery, a further improvement in the charge-discharge capacity per unit volume is required in accordance with the demands for the further miniaturization of electronic appliances and for the continuous use of the secondary battery over a longer period of time. Such being the situation, vigorous research is being conducted in an attempt to develop a lithium ion secondary battery meeting these requirements. However, a sufficiently satisfactory result has not yet been obtained. Therefore, it is necessary to develop a new negative electrode material for commercializing a secondary battery having a larger capacity.

It is proposed to use an elemental metal such as aluminum (Al), silicon (Si), germanium (Ge), tin (Sn), or antimony (Sb) as a negative electrode material that permits obtaining a capacity larger than that obtained by a carbonaceous material. Particularly, in the case of using Si as a negative electrode material, it is possible to obtain a large capacity, i.e., a capacity of 4,200 mAh per unit weight (1 g). However, in the case of using a negative electrode formed of the elemental metal exemplified above, the bond between the adjacent metal atoms is broken due to the repetition of the absorption-desorption of Li, which leads to fine pulverization of the negative electrode, resulting in failure to obtain high charge-discharge cycle characteristics.

Under the circumstances, it is attempted to improve the charge-discharge cycle life of the secondary battery by using as the negative electrode material an alloy containing element T1 that does not form an alloy with lithium, such as Ni, V, Ti or Cr and element T2 forming an alloy with lithium. Also, in order to suppress the pulverization of the negative electrode material, which causes the deterioration of the cycle characteristics of the secondary battery, it is attempted to suppress the volume expansion by dispersing, for example, a phase reactive with lithium such as an element T2 phase, and a phase that is inactive with lithium, such as an element T1 phase in a nano scale, or by making the entire alloy phase amorphous.

In any of the negative electrode materials described above, an alloying reaction is carried out between the negative electrode material and lithium so as to permit lithium to be absorbed by the negative electrode material. The initial charging reaction is as exemplified by reaction formula (A) given below:

$$T1_xT2_y + Li \rightarrow xT1 + LiT2_y \quad\quad (A)$$

The second charge-discharge reaction et seq. after the initial charge-discharge reaction proceeds as denoted by reaction formula (B) given below:

$$xT1 + LiT2_y \Leftrightarrow Li + yT2 \quad\quad (B)$$

Since the reaction in the second reaction et seq. given by reaction formula (B) does not proceed completely reversibly, Li is retained inside the alloy, and the lithium supply source is depleted if the charge-discharge cycle is repeated, which makes it impossible to further repeat the charge-discharge cycle. Incidentally, in the case of an amorphous alloy, the reaction proceeds smoothly in the initial stage. However, the crystallization of the amorphous alloy is promoted if the charge-discharge cycle is repeatedly carried out, with the result that the cycle deterioration is generated at the stage where the crystallization is promoted.

It should also be noted that the negative electrode material that carries out an alloying reaction with lithium in the charging stage exhibits a high reactivity with the nonaqueous electrolyte containing a nonaqueous solvent and, thus, a film of, for example, $Li_2CO_3$, is formed on the surface of the negative electrode as a result of the reaction carried out between lithium contained in the negative electrode material and the nonaqueous electrolyte. It follows that the Coulomb efficiency is lowered during the charge-discharge cycle. Further, in the case of using a positive electrode active material such as $LiCoO_2$ as a lithium supply source, lithium in the supply source is depleted with progress in the charge-discharge cycle, with the result that a clear capacity deterioration is observed.

A nonaqueous electrolyte secondary battery comprising a negative electrode containing an alloy formed of at least two kinds of elements, the alloy having a hexagonal close-packed structure and a $Ni_2In$ type structure, is disclosed in, for example, Japanese Patent Disclosure (Kokai) No. 2001-250541. In this negative electrode, an element $M^1$ such as tin or aluminum, which is capable of electrochemically carrying out an alloying reaction with lithium, is alloyed with lithium so as to charge the secondary battery. Therefore, lithium is stored within the alloy with progress in the charge-discharge cycle so as to decrease the lithium amount contributing to the charge-discharge operation. In addition, this negative electrode has a high reactivity with the nonaqueous electrolyte and, thus, the Coulomb efficiency is low during the charge-discharge cycle. It follows that the secondary battery disclosed in the prior art quoted above is incapable of obtaining a long charge-discharge cycle life.

BRIEF SUMMARY OF THE INVENTION

An object of the present invention is to provide a nonaqueous electrolyte secondary battery excellent in both the charge-discharge cycle life and the discharge capacity per unit volume.

According to a first aspect of the present invention, there is provided a nonaqueous electrolyte secondary battery comprising:
a positive electrode;
a negative electrode containing an alloy having a TiNiSi type crystal structure; and
a nonaqueous electrolyte.

According to a second aspect of the present invention, there is provided a nonaqueous electrolyte secondary battery comprising:
a positive electrode;
a negative electrode containing an alloy having a ZrBeSi type crystal structure; and
a nonaqueous electrolyte.

Further, according to a third aspect of the present invention, there is provided a nonaqueous electrolyte secondary battery comprising:
a positive electrode;
a negative electrode containing an alloy having a $CeNiSi_2$ type crystal structure; and
a nonaqueous electrolyte.

DETAILED DESCRIPTION OF THE INVENTION

A nonaqueous electrolyte secondary battery according to a first embodiment of the present invention will now be described. The nonaqueous electrolyte secondary battery comprises a positive electrode, a negative electrode containing an alloy having a TiNiSi type crystal structure, and a nonaqueous electrolyte layer provided between the positive electrode and the negative electrode.

The negative electrode, the positive electrode and the nonaqueous electrolyte layer included in the nonaqueous electrolyte secondary battery will now be described.

1) Negative Electrode

Figure 1:
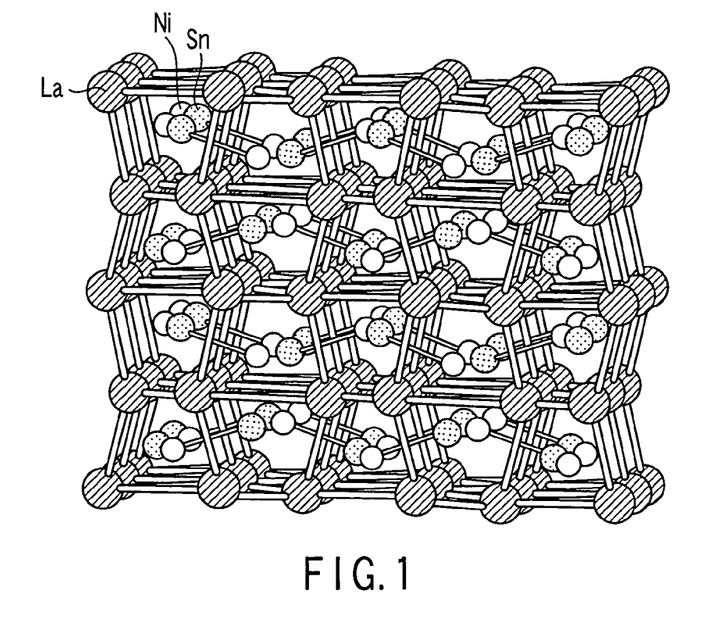
FIG. 1 schematically exemplifies the construction of the unit cell of a TiNiSi type crystal.

FIG. 1 schematically shows the construction of the unit cell of the TiNiSi type crystal, covering the case where the alloy has an LaNiSn composition. Specifically, the circles shaded with oblique lines, which are shown in FIG. 1, denote La sites, the white circles denote Ni sites, and the circles shaded with dots denote Sn sites.

As shown in FIG. 1 mentioned above, the TiNiSi type crystal structure covers not only the case where it is made basically of the three types of elements Ti, Ni and Si, but also the case where, as long as its crystal structure is maintained, the basic elements Ti, Ni and Si are substituted by different types of elements such as Ln, M or Sn.

It is possible for the alloy to be a single phase alloy consisting of a TiNiSi type crystal phase or to be a polyphase alloy including a TiNiSi type crystal phase and another crystal phase.

The crystal axis b of the TiNiSi type crystal is the crystal axis parallel to the depth direction in FIG. 1. Lithium is inserted into the free space between the adjacent layers in a direction perpendicular to crystal axis b. It is desirable for the lattice constant of crystal axis b to fall within a range of 4 Å to 5.5 Å. If the lattice constant of crystal axis b is smaller than 4 Å, it is difficult to interpose the lithium ions between the adjacent layers of the crystal. On the other hand, if the lattice constant of crystal axis b exceeds 5.5 Å, the TiNiSi type crystal phase possibly fails to be obtained. It is more desirable for the lattice constant of crystal axis b to fall within a range of 4.2 Å to 5.3 Å.

It is desirable for the elements constituting the alloy to include Sn because this will enable the secondary battery to exhibit a higher discharge capacity per unit volume. It is more desirable for the elements constituting the alloy to include at least one kind of element, Ln, selected from the elements having an atomic radius falling within a range of $1.6 \times 10^{-10}$ m to $2.2 \times 10^{-10}$ m, in addition to Sn. If the alloy contains both Sn and Ln, it is possible for the absorbing-desorbing reaction of lithium to be carried out-more-smoothly. It is also possible to increase the stability of the crystal so as to permit the lattice constant of crystal axis b to fall within a range of 4 Å to 5.5 Å.

The composition of the alloy is not particularly limited as long as the alloy includes the TiNiSi type crystal phase. However, it is desirable for the alloy to have a composition represented by formula (1) given below:

$$(Ni_{1-(x+z)}Ln_xM_z)_ySn_{100-y} \quad (1)$$

where Ln denotes at least one kind of element selected from the elements having an atomic radius falling within a range of $1.6 \times 10^{-10}$ m to $2.2 \times 10^{-10}$ m, M is at least one element selected from the group consisting of Ti, V, Co, Fe and Nb, and x, y and z satisfy the conditions of $0.4 \leq x+z \leq 0.7$, $40 \leq y \leq 80$ and $0 \leq z \leq 0.2$.

As shown in formula (1) given above, the alloy used in the present invention contains at least one kind of element Ln selected from the elements having an atomic radius falling within a range of $1.6 \times 10^{-10}$ m to $2.2 \times 10^{-10}$ m. Use of Ln permits the lithium ions to be interposed easily between the adjacent layers of the crystal. In the case of using an element having an atomic radius, which exceeds $2.2 \times 10^{-10}$ m or which is smaller than $1.6 \times 10^{-10}$ m, as element Ln, it is difficult to maintain the TiNiSi type crystal structure or it is difficult to interpose the lithium ions between the adjacent layers of the crystal.

The elements Ln that can be used desirably in the present invention include, for example, La having an atomic radius of $1.88 \times 10^{-10}$ m, Ce having an atomic radius of $1.83 \times 10^{-10}$ m, Pr having an atomic radius of $1.83 \times 10^{-10}$ m, Nd having an atomic radius of $1.82 \times 10^{-10}$ m, Pm having an atomic radius of $1.80 \times 10^{-10}$ m, Sm having an atomic radius of $1.79 \times 10^{-10}$ m, Mg having an atomic radius of $1.60 \times 10^{-10}$ m, Ca having an atomic radius of $1.97 \times 10^{-10}$ m, Sr having an atomic radius of $2.15 \times 10^{-10}$ m, Ba having an atomic radius of $2.18 \times 10^{-10}$ m, Y having an atomic radius of $1.82 \times 10^{-10}$ m, Zr having an atomic radius of $1.62 \times 10^{-10}$ m, and Hf having an atomic radius of $1.60 \times 10^{-10}$ m.

If the sum atomic ratio (x+z) of the element Ln and the element M is smaller than 0.4, it is difficult to interpose the lithium ions between the adjacent layers of the crystal, possibly resulting in failure to obtain a high charging capacity. On the other hand, if the sum atomic ratio (x+z) exceeds 0.7, a phase such as a LnSn phase, which performs easily an alloying reaction with lithium, is formed in addition to the TiNiSi type crystal structure, with the result that the charge-discharge cycle life of the secondary battery tends to be shortened. It is more desirable for the sum atomic ratio (x+z) to fall within a range of 0.45 to 0.65.

It is also possible to permit at least one kind of element, M, selected from the group consisting of Ti, V, Co, Fe and Nb to be contained in the alloy. Where the alloy contains at least one kind of element M, it is possible to stabilize the crystal structure and to prolong the charge-discharge cycle life of the secondary battery. It should be noted, however, that, if the addition amount z of element M exceeds 0.2, it is difficult to maintain the crystal structure, which may cause a reduction in the charge-discharge capacity or the charge-discharge cycle life. It is more desirable for the addition amount z of the element M to fall within a range of 0 to 0.15.

The sum atomic ratio y, i.e., the atomic ratio of the sum of Ni, the element Ln and the element M, is defined in the present invention to fall within a range of 40 to 80, as shown in formula (1). If the sum atomic ratio y noted above is smaller than 40, the Sn single phase is precipitated, with the result that the pulverization of the alloy tends to be promoted, which shortens the charge-discharge cycle life of the secondary battery. On the other hand, if the sum atomic ratio y exceeds 80, the alloy fails to have the TiNiSi type crystal structure such that, for example, the $Ni_3Sn_2$ phase that is quite inactive to lithium constitutes the principal phase of the crystal. It follows that the charge-discharge characteristics or the charge-discharge capacity of the secondary battery would be lowered. It is more desirable for the sum atomic ratio y to fall within a range of 45 to 75.

In the alloy having the TiNiSi type crystal structure, it is possible for a part of the constituting elements to be replaced by another element in order to impart a local strain to the crystal structure or change the Fermi level of alloy.

An alloy having the TiNiSi type crystal structure can be manufactured by, for example, a rapid solidification method. In the rapid solidification method, the raw alloy materials weighed in advance are melted within a crucible in an inert gas atmosphere, followed by spraying the resultant alloy melt onto a cooled body rotated at a high speed so as to obtain a flake-like sample having a thickness of 10 to 50 μm. It is possible to apply a heat treatment to the obtained sample so as to homogenize the texture and the composition of the sample.

The negative electrode is prepared by dispersing in a suitable solvent a negative electrode mixture including a negative electrode active material containing an alloy having, for example, the TiNiSi type crystal structure, an electrically conductive agent, and a binder so as to obtain a dispersion, followed by coating one surface or both surfaces of a current collector with the resultant suspension and subsequently drying the coating and, as required, applying a pressing to the dried coating.

Also, in the case of using as the negative electrode active material a mixture containing the alloy described above and a carbonaceous material having a high absorption capability of an alkali metal, it is possible to improve the absorption capability of the alkali metal such as lithium. It is desirable to use a graphitized material, e.g., a mesophase pitch carbon fiber (MCF), as the carbonaceous material used for preparing the negative electrode active material.

Further, it is possible to use a carbonaceous material as the electrically conductive agent contained in the negative electrode. If a carbonaceous material having a high absorption capability of the alkali metal and a high electrical conductivity is used as the carbonaceous material contained in the negative electrode, it is possible for the carbonaceous material to act also as the electrically conductive agent. If graphitized material, which has a high alkali metal absorption capability, such as mesophase pitch carbon fiber, is used singly as a carbonaceous material for the negative electrode active material, the electrical conductivity of the negative electrode tends to be lowered. Such being the situation, it is desirable to use a carbon material such as acetylene black or carbon black as an electrically conductive agent together with the graphitized material noted above.

The binder used in the present invention includes, for example, polytetrafluoroethylene (PTFE), polyvinylidene fluoride (PVdF), a fluorinated rubber, a styrene-butadiene rubber (SBR), and carboxy methyl cellulose (CMC).

Concerning the mixing ratio of the negative electrode active material, the electrically conductive agent and the binder, it is desirable for the negative electrode active material to be mixed in an amount of 70 to 95% by weight, for the conductive agent to be mixed in an amount of 0 to 25% by weight, and for the binder to be mixed in an amount of 2 to 10% by weight.

The current collector used for the negative electrode is not particularly limited as long as the current collector is formed of an electrically conductive material. For example, it is possible to use a foil, a mesh, a punched metal or a lath metal made of copper, stainless steel or nickel.

2) Positive Electrode

The positive electrode includes a current collector and a positive electrode active material layer formed on one surface or both surfaces of the current collector.

The positive electrode can be prepared by, for example, dispersing in a suitable solvent a positive electrode active material, an electrically conductive agent, and a binder so as to obtain a suspension, followed by coating the surface of the current collector with the resultant suspension and subsequently drying the coating and pressing the dried coating.

The positive electrode active material used in the present invention is not particularly limited as long as the substance is capable of absorbing the alkali metal in the discharging stage of the secondary battery and desorbing the absorbed alkali metal in the charging stage of the secondary battery.

To be more specific, the positive electrode active material can be provided by various oxides and sulfides including, for example, manganese oxide ($MnO_2$), lithium manganese-containing complex oxides such as $LiMn_2O_4$ and $LiMnO_2$, lithium nickel-containing complex oxides such as $LiNiO_2$, lithium cobalt-containing complex oxides such as $LiCoO_2$, lithium nickel cobalt-containing complex oxides such as $LiNi_{1-x}Co_xO_2$, lithium manganese cobalt-containing complex oxides such as $LiMn_xCo_{1-x}O_2$, and vanadium oxides such as $V_2O_5$. It is also possible for the positive electrode active material to be provided by an organic material such as an electrically conductive polymer material or a disulfide series polymer material.

It is more desirable for the positive electrode active material to be provided by a material that permits increasing the battery voltage, such as a lithium manganese-containing complex oxide, e.g., $LiMn_2O_4$, a lithium nickel-containing complex oxide, e.g., $LiNiO_2$, a lithium cobalt-containing complex oxide, e.g., $LiCoO_2$, a lithium nickel cobalt-containing complex oxide, e.g., $LiNi_{0.8}Co_{0.2}O_2$, and a lithium manganese cobalt-containing complex oxide, e.g., $LiMn_xCo_{1-x}O_2$.

The current collector used in the present invention is not particularly limited as long as the current collector is formed of an electrically conductive material. Particularly, it is desirable for the current collector included in the positive electrode to be formed of a material that is unlikely to be oxidized during the battery reaction. For example, it is desirable to use aluminum, stainless steel or titanium.

The electrically conductive agent used in the present invention includes, for example, an acetylene black, a carbon black and graphite.

The binder used in the present invention includes, for example, polytetrafluoroethylene (PTFE), polyvinylidene fluoride (PVdF) and a fluorinated rubber.

Regarding the mixing ratio of the positive electrode active material, the electrically conductive agent and the binder, it is desirable for the positive electrode active material to be mixed in an amount of 80 to 95% by weight, for the conductive agent to be mixed in an amount of 3 to 20% by weight, and for the binder to be mixed in an amount of 2 to 7% by weight.

3) Nonaqueous Electrolyte Layer

The nonaqueous electrolyte layer serves to impart an ionic conductivity between the negative electrode and the positive electrode.

It is possible to use a nonaqueous electrolyte layer prepared by allowing a nonaqueous electrolyte solution, which is prepared by dissolving an electrolyte in a nonaqueous solvent, to be supported by a separator formed of a porous material.

The separator serves to hold the nonaqueous electrolysis solution and to achieve an electrical insulation between the positive electrode and the negative electrode. The separator used in the present invention is not particularly limited as long as the separator is formed of an insulating material and permits the ion migration between the positive electrode and the negative electrode. For example, it is possible to use a synthetic resin unwoven fabric, a polyethylene porous film or a polypropylene porous film for forming the separator.

The nonaqueous solvent used in the present invention includes, for example, a nonaqueous solvent containing as a main component a cyclic carbonate such as ethylene carbonate (EC) or propylene carbonate (PC) and another nonaqueous solvent consisting mainly of a mixed solvent containing a cyclic carbonate and a nonaqueous solvent having a viscosity lower than that of the cyclic carbonate.

The nonaqueous solvent having a low viscosity noted above includes, for example, a linear carbonate, y-butyrolactone, acetonitrile, methyl propionate, ethyl propionate, a cyclic ether, and a linear ether. The linear carbonate noted above includes, for example, dimethyl carbonate, methyl ethyl carbonate, and diethyl carbonate. Also, the cyclic ether noted above includes, for example, tetrahydrofuran and 2-methyl tetrahydrofuran. On the other hand, the linear ether noted above includes, for example, dimethoxy ethane and diethoxy ethane.

The electrolyte used in the present invention includes, for example, lithium hexafluoro phosphate ($LiPF_6$), lithium tetrafluoro borate ($LiBF_4$), lithium hexafluoro arsenate ($LiAsF_6$), lithium perchlorate ($LiClO_4$), and lithium trifluoro metasulfonate ($LiCF_3SO_3$). Particularly, it is desirable to use at least one electrolyte of lithium hexafluoro phosphate ($LiPF_6$) and lithium tetrafluoro borate ($LiBF_4$).

It is desirable for the electrolyte to be dissolved in the nonaqueous solvent in an amount of 0.5 to 2 mol/L.

It is possible to use a gel-like material, which is prepared by allowing a polymer material to contain a nonaqueous electrolysis solution, in the nonaqueous electrolyte layer. To be more specific, it is possible to arrange an electrolyte layer formed of the gel-like material between the positive electrode and the negative electrode. It is also possible to use as the electrolyte layer the separator holding the gel-like material.

The polymer material used in the present invention for preparing the gel-like material includes, for example, a monomer or polymer of polyacrylonitrile, polyacrylate, polyvinylidene fluoride (PVdF) or polyethylene oxide (PEO), or a copolymer between any of these monomers and another monomer.

It is also possible to use as the nonaqueous electrolyte layer a solid polymer electrolyte layer prepared by dissolving an electrolyte in the polymer material, followed by solidifying the resultant solution. The polymer material used in the present invention for preparing the solid polymer electrolyte layer includes, for example, a monomer or polymer of polyacrylonitrile, polyvinylidene fluoride (PVdF), or polyethylene oxide (PEO), or a copolymer between any of these monomers and another monomer. It is also possible to use an inorganic solid electrolyte for forming the nonaqueous electrolyte layer. The inorganic solid electrolyte used in the present invention includes, for example, a ceramic material containing lithium. To be more specific, the inorganic solid electrolyte noted above includes, for example, $Li_3N$, $Li_3PO_4$—$Li_2S$—$SiS_2$, and $LiI$—$Li_2S$—$SiS_2$ glass.

The nonaqueous electrolyte secondary battery according to the first embodiment of the present invention described above comprises a negative electrode containing an alloy having a TiNiSi type crystal structure. The alloy of the particular crystal structure does not perform an alloying reaction with lithium when lithium ions are interposed between the adjacent layers of the crystal in the charging stage. Also, the interposed lithium ions are released from between the adjacent layers of the crystal in the discharge stage. It follows that lithium can be intercalated into and deintercalated from between the adjacent layers of the crystal without bringing about the alloying reaction between the alloy and lithium in the charge-discharge stages so as to enhance the reversibility of the intercalation/deintercalation reaction of lithium. It is also possible to increase the stability of the crystal because the volume expansion can be suppressed in the lithium insertion stage. Further, it is possible to suppress the reaction between the negative electrode and the nonaqueous electrolyte. It follows that the Coulomb efficiency can be increased during the charge-discharge cycle so as to realize high charge-discharge cycle characteristics.

It should also be noted that, in the present invention, the lattice constant of the crystal axis b of the alloy having the TiNiSi type crystal structure is set to fall within a range of 4 Å to 5.5 Å so as to carry out smoothly the intercalation/deintercalation reaction of lithium. It follows that the charge-discharge cycle characteristics of the secondary battery can be further improved.

The alloy having the TiNiSi type crystal structure has a composition represented by formula (1) given previously. In this case, the alloy density can be increased to a high level, i.e., can be increased to 7.8 g/cm$^3$ on the average, so as to make it possible to further increase the capacity per unit volume. It follows that it is possible to provide a secondary battery excellent in the capacity per unit volume and in the charge-discharge cycle characteristics.

A nonaqueous electrolyte secondary battery according to a second embodiment of the present invention will now be described. The nonaqueous electrolyte secondary battery comprises a positive electrode, a negative electrode containing an alloy having a ZrBeSi type crystal structure, and a nonaqueous electrolyte layer provided between the positive electrode and the negative electrode. The positive electrode and the nonaqueous electrolyte layer similar to those described previously in conjunction with the first embodiment can be used in the second embodiment. Such being the situation, the negative electrode included in the nonaqueous electrolyte secondary battery according to the second embodiment of the present invention will now be described.

Figure 2:
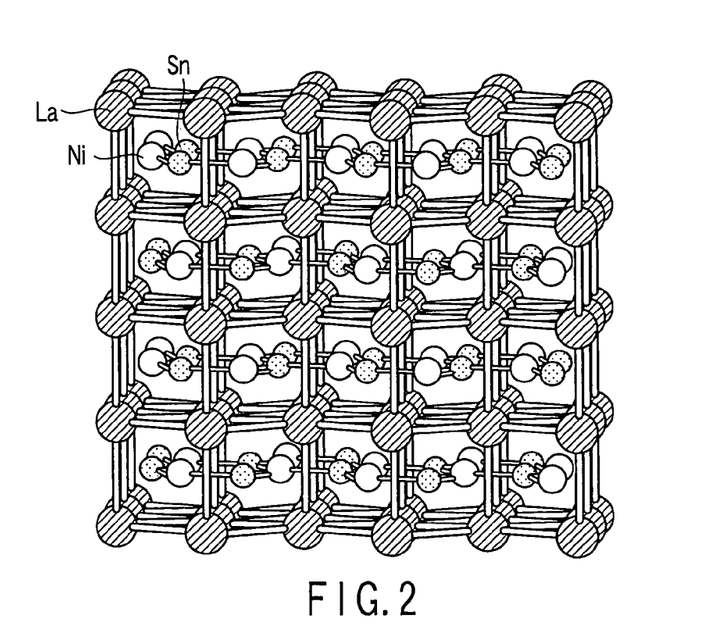
FIG. 2 schematically exemplifies the construction of the unit cell of a ZrBeSi type crystal.

FIG. 2 schematically shows the construction of the unit cell of the ZrBeSi type crystal in the case where the alloy has a LaNiSn composition. Specifically, the circles shaded with oblique lines, which are shown in FIG. 2, denote La sites, the white circles denote Ni sites, and the circles shaded with dots denote Sn sites.

As shown in FIG. 2 mentioned above, the ZrBeSi type crystal structure covers not only the case where it is made basically of the three types of elements Zr, Be and Si, but also the case where, as long as its crystal structure is maintained, the basic elements Zr, Be and Si are substituted by different types of elements such as Sn and rare earth elements.

It is possible for the alloy to be a single phase alloy consisting of a ZrBeSi type crystal phase or to be a polyphase alloy including a ZrBeSi type crystal phase and another crystal phase.

The crystal axis "a" of the ZrBeSi type crystal is the crystal axis parallel to the depth direction in FIG. 2. Lithium is interposed between the adjacent layers in a direction perpendicular to the crystal axis "a". It is desirable for the lattice constant of the crystal axis "a" to fall within a range of 4 Å to 5.5 Å. If the lattice constant of the crystal axis "a" is smaller than 4 Å, the interposition of the lithium ions between the adjacent layers of the crystal tends to be rendered difficult. On the other hand, if the lattice constant of the crystal axis "a" exceeds 5.5 Å, it is possible for the ZrBeSi type crystal phase to fail to be obtained. It is more desirable for the lattice constant of the crystal axis "a" to fall within a range of 4.2 Å to 5.3 Å.

It is possible to prepare an alloy having the ZrBeSi type crystal structure by, for example, a induction heating method. In the induction heating method, it comprises pouring a melt onto a rotating cooling plate in the casting stage. It is possible to control the thickness of the deposited melt by adjusting the melt supply rate and the moving speed of the cooling plate, thereby controlling the cooling rate. A heat treatment is applied to the obtained sample so as to homogenize the texture and the composition of the alloy.

The negative electrode can be prepared by a method similar to that described previously in conjunction with the first embodiment.

The nonaqueous electrolyte secondary battery of the second embodiment of the present invention described above comprises a negative electrode containing an alloy having a ZrBeSi type crystal structure. The alloy of the particular crystal structure makes it possible to intercalate or deintercalate lithium into or out of between the adjacent layers of the crystal without bringing about an alloying reaction between the alloy and lithium. As a result, the reversibility of the intercalation/deintercalation of lithium can be enhanced. It is also possible to increase the stability of the crystal because the volume expansion can be suppressed in the lithium insertion stage. Further, it is possible to suppress the reaction between the negative electrode and the nonaqueous electrolyte. It follows that the Coulomb efficiency can be increased during the charge-discharge cycle so as to realize high charge-discharge cycle characteristics.

It should also be noted that, in the present invention, the lattice constant of the crystal axis "a" of the alloy having the ZrBeSi type crystal structure is set to fall within a range of 4 Å to 5.5 Å so as to carry out smoothly the intercalation/deintercalation reaction of lithium. It follows that the charge-discharge cycle characteristics of the secondary battery can be further improved.

As described above, the alloy having any of the TiNiSi type crystal structure or the ZrBeSi type crystal structure makes it possible to permit lithium to be intercalated into and deintercalated from between the adjacent layers of the crystal without bringing about the alloying reaction between the alloy and lithium in the charge-discharge stages. It is considered reasonable to understand that the particular function can be achieved as follows.

As pointed out in Japanese Patent Disclosure No. 2001-250541 referred to previously, different elements $M^1$ and $M^2$ are alternately present on a plane constituting the same layer in the $Ni_2In$ type crystal structure. As a result, the agglomeration of $M^1$ atoms caused by the alloying reaction with lithium is suppressed so as to stabilize the structure. On the other hand, the TiNiSi type crystal structure or the ZrBeSi type crystal structure of the alloy used in the first and second embodiments of the present invention is featured in that two kinds of atoms other than Ln are alternately bonded with each other so as to form a hexagonal plane such as graphite. In this case, it is considered reasonable to understand that there is an electron orbit that permits electrons to be given to and received from the lithium ion in a direction perpendicular to the formed hexagonal plane. In addition, since the coupling between the adjacent atoms is more stable than that of the $Ni_2In$ type crystal structure, it is possible for the intercalation reaction rather than the alloying reaction to take place.

A nonaqueous electrolyte secondary battery according to a third embodiment of the present invention will now be described. The nonaqueous electrolyte secondary battery comprises a positive electrode, a negative electrode containing an alloy having a $CeNiSi_2$ type crystal structure, and a nonaqueous electrolyte layer provided between the positive electrode and the negative electrode. The positive electrode and the nonaqueous electrolyte layer similar to those described previously in conjunction with the first embodiment can be used in the third embodiment. Such being the situation, the negative electrode included in the nonaqueous electrolyte secondary battery according to the third embodiment of the present invention will now be described.

Figure 9:
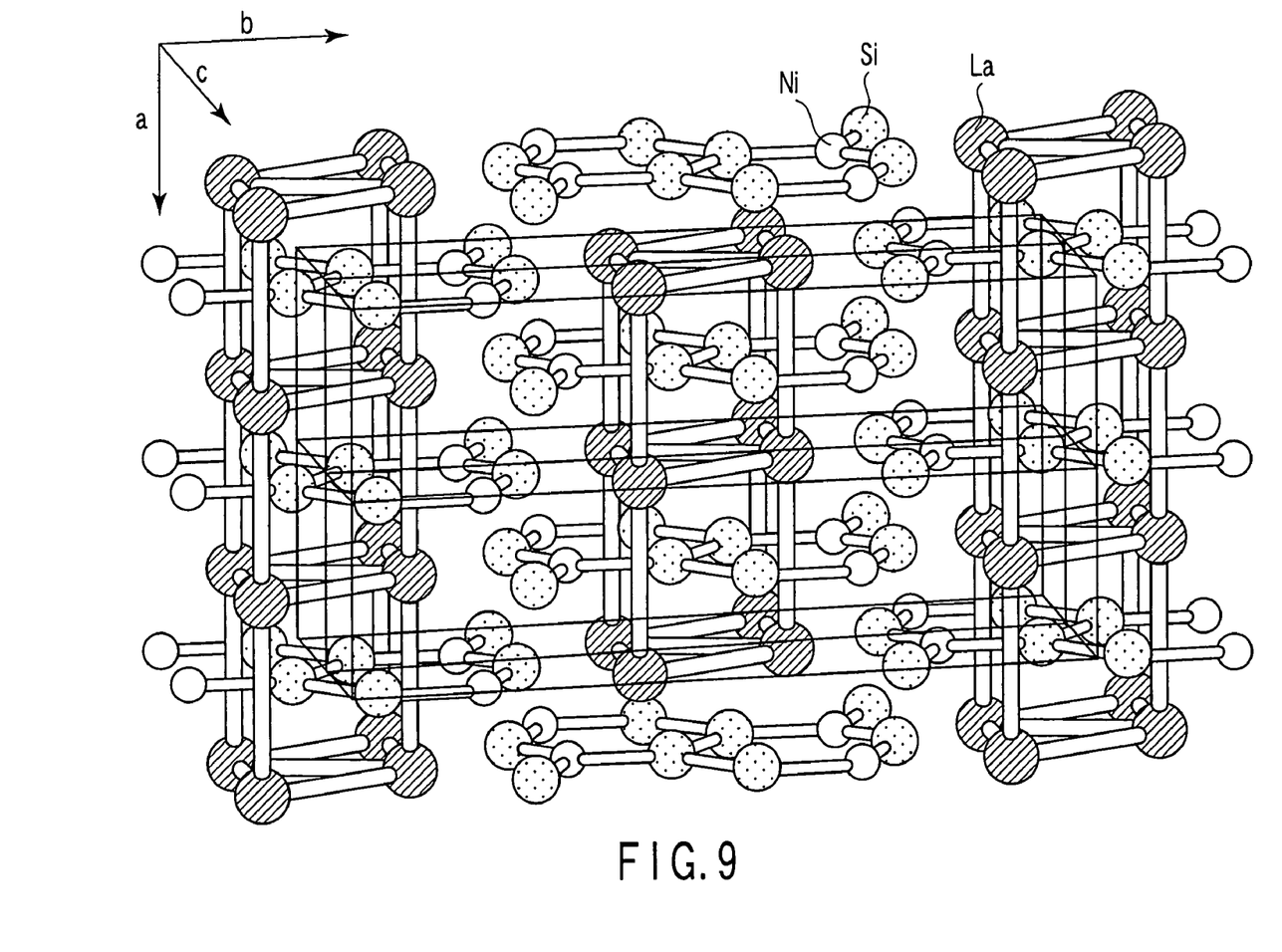
FIG. 9 schematically exemplifies the construction of the unit cell of a $CeNiSi_2$ type crystal.

FIG. 9 schematically shows the construction of the $CeNiSi_2$ type crystal. Specifically, the circles shaded with oblique lines, which are shown in FIG. 9, denote La sites, the white circles denote Ni sites, and the circles shaded with dots denote Si sites. Also, the region surrounded by a solid line denotes a unit cell of the $CeNiSi_2$ type crystal. Further, crystal axes a, b, c are as shown in FIG. 9.

As shown in FIG. 9 mentioned above, the $CeNiSi_2$ type crystal structure covers not only the case where it is made basically of the three types of elements Ce, Ni and Si, but also the case where, as long as its crystal structure is maintained, the basic elements Ce, Ni and Si are substituted by different types of elements such as Ln, M1 or M2.

It is possible for the alloy to be a single phase alloy consisting of a $CeNiSi_2$ type crystal phase or to be a polyphase alloy including a $CeNiSi_2$ type crystal phase and another crystal phase.

It is desirable for the lattice constant of the crystal axis "a" to fall within a range of 3.5 Å to 5.5 Å. If the lattice constant of the crystal axis "a" is smaller than 3.5 Å, it is difficult to interpose the lithium ions between the adjacent layers of the crystal. On the other hand, if the lattice constant of the crystal axis "a" exceeds 5.5 Å, it is possibly difficult to obtain the $CeNiSi_2$ type crystal phase. It is more desirable for the lattice constant of the crystal axis "a" to fall within a range of 4 Å to 5 Å.

It is desirable for the alloy to contain at least one additional element selected from the group consisting of P, Si, Ge, Sn and Sb because the discharge capacity per unit volume of the secondary battery can be increased in the case where the alloy contains the additional element.

It is desirable for the alloy to have a composition represented by formula (2) given below:

$$LnM1_xM2_y \quad (2)$$

where Ln denotes at least one kind of element selected from the elements having an atomic radius falling within a range of $1.6 \times 10^{-10}$ m to $2.2 \times 10^{-10}$ m, M1 is at least one element selected from the group consisting of Ti, V, Cr, Mn, Fe, Co, Ni, Cu, Zn, and Nb, M2 is at least one element selected from the group consisting of P, Si, Ge, Sn and Sb, and x and y satisfy the conditions of $0.5 \leq x \leq 1.5$ and $1.5 \leq y \leq 3.5$.

As shown in formula (2) given above, the alloy used in one embodiment of the present invention contains at least one kind of element, Ln, selected from the elements having an atomic radius falling within a range of $1.6 \times 10^{-10}$ m to $2.2 \times 10^{-10}$ m. Use of Ln permits the lithium ions to be interposed easily into between the adjacent layers of the crystal. In the case of using an element having an atomic radius, which exceeds $2.2 \times 10^{-10}$ m or which is smaller than $1.6 \times 10^{-10}$ m, as element Ln, it is difficult to maintain the $CeNiSi_2$ type crystal structure or it is difficult to interpose the lithium ions between the adjacent layers of the crystal.

The elements Ln that can be used desirably in one embodiment of the present invention include, for example, La having an atomic radius of $1.88 \times 10^{-10}$ m, Ce having an atomic radius of $1.83 \times 10^{-10}$ m, Pr having an atomic radius of $1.83 \times 10^{-10}$ m, Nd having an atomic radius of $1.82 \times 10^{-10}$ m, Pm having an atomic radius of $1.80 \times 10^{-10}$ m, Sm having an atomic radius of $1.79 \times 10^{-10}$ m, Mg having an atomic radius of $1.60 \times 10^{-10}$ m, Ca having an atomic radius of $1.97 \times 10^{-10}$ m, Sr having an atomic radius of $2.15 \times 10^{-10}$ m, Ba having an atomic radius of $2.18 \times 10^{-10}$ m, Y having an atomic radius of $1.82 \times 10^{-10}$ m, Zr having an atomic radius of $1.62 \times 10^{-10}$ m, and Hf having an atomic radius of $1.60 \times 10^{-10}$ m.

It is possible to stabilize the $CeNiSi_2$ type crystal structure by introducing into the alloy at least one kind of element, M1, selected from the group consisting of Ti, V, Cr, Mn, Fe, Co, Ni, Cu, Zn and Nb. It should be noted, however, that, if the atomic ratio x of the element M1 is lower than 0.5 or exceeds 1.5, it is possible for the $CeNiSi_2$ type crystal structure not to be obtained. Naturally, it is desirable for the atomic ratio x noted above to be not smaller than 0.5 and not larger than 1.5. It is more desirable for the atomic-ratio x to fall within a range of 0.6 to 1.3.

If the atomic ratio y of the element M2 is smaller than 1.5, it is possible for the ratio of the crystal phase other than the $CeNiSi_2$ type crystal phase, e.g., the ratio of the TiNiSi type crystal phase, to be increased. It should be noted that the lithium diffusion rate in the TiNiSi type crystal phase is lower than that in the $CeNiSi_2$ type crystal phase. It follows that, if the current density in the charge-discharge stage is increased in the secondary battery comprising a negative electrode containing an alloy having an atomic ratio y of the element M2, which is smaller than 1.5, it is difficult to maintain a sufficient capacity. On the other hand, if the atomic ratio y of the element M2 exceeds 3.5, a phase that carries out easily the alloying reaction with lithium, e.g., the LnSn phase, is generated, with the result that the charge-discharge cycle life of the secondary battery tends to be shortened. Such being the situation, it is more desirable for the atomic ratio y to fall within a range of 1.7 to 2.5.

In the alloy having a $CeNiSi_2$ type crystal structure, it is possible for a part of the constituting elements to be replaced by another element in order to impart a local strain to the crystal structure or to change the Fermi level of the alloy.

It is possible to prepare an alloy having the $CeNiSi_2$ type crystal structure by, for example, a induction heating method. In the induction heating method, it comprises pouring a melt onto a rotating cooling plate in the casting stage. It is possible to control the thickness of the deposited melt by adjusting the melt supply rate and the moving speed of the cooling plate, thereby controlling the cooling rate. In order to obtain an alloy having a $CeNiSi_2$ type crystal structure, it is preferable that the melt cooling rate should be set in a range of $10^1$ to $10^4$ (K/s). This is because if the cooling rate exceeds $10^4$ (K/s), the crystallinity of the obtained intermetallic compound becomes excessively low, thus making it difficult to maintain the $CeNiSi_2$ type crystal structure. It is possible to apply a heat treatment to the obtained sample so as to homogenize the texture and the composition of the sample.

The negative electrode can be prepared by, for example, dispersing a negative electrode mixture containing a negative electrode active material including an alloy having a $CeNiSi_2$ type crystal structure, an electrically conductive agent and a binder in a suitable solvent so as to obtain a suspension, followed by coating one surface or both surfaces of a current collector with the suspension thus obtained and subsequently drying the coating.

In the case of using as the negative electrode active material a mixture containing an alloy having a $CeNiSi_2$ type crystal structure and a carbonaceous material having a high alkali metal absorption capability, it is possible to increase the absorption amount of the alkali metal such as lithium. It is desirable to use a graphitized material as the carbonaceous material acting as the negative electrode active material. It should be noted, however, that, if a graphitized material having a high alkali metal absorption capability is used as the carbonaceous material, the electrical conductivity of the negative electrode may be lowered. Such being the situation, it is desirable to use another carbon material such as an acetylene black or a carbon black as the electrically conductive agent together with the graphitized material used as the negative electrode active material.

It is desirable for the negative electrode containing an alloy having a $CeNiSi_2$ type crystal structure to have a structure satisfying formula (3) given below:

$$0.95 \geq (w/d)/\rho \geq 0.55 \qquad (3)$$

where $\rho$ denotes the true density (g/cm$^3$) of the alloy, d denotes the thickness (μm) of the negative electrode, and w denotes the weight per unit area (g/m$^2$) of the negative electrode.

It should be noted that the intermetallic compound having a $CeNiSi_2$ type crystal structure has an inner diffusion rate of lithium ions lower than that of the graphitized material such as graphite. It follows that, if the intermetallic compound is mixed in a large amount with the graphitized material, the lithium intercalation into the intermetallic compound is not completely finished even at the time when lithium has been intercalated into the graphitized material in a theoretical capacity, with the result that the intermetallic compound fails to exhibit its performance sufficiently. Also, if the secondary battery containing the mixture noted above as a negative electrode active material is charged for a long time, the metal lithium is precipitated on the periphery of the graphitized material so as to give rise to a problem in respect of the safety of the secondary battery. It is possible for these problems to take place in the case where the value of $(w/d)/\rho$ is smaller than 0.55. It follows that it is desirable for the value of $(w/d)/\rho$ to be not smaller than 0.55. It is possible to make the value of $(w/d)/\rho$ very close to 1 depending on the manufacturing conditions such as the pressing pressure and the pressing rate. However, in this case, it is difficult for the electrolysis solution to permeate inside the negative electrode. Such being the situation, it is desirable for the value of $(w/d)/\rho$ to be not larger than 0.95. It is more desirable for the value of $(w/d)/\rho$ to satisfy $0.6 \leq (w/d)/\rho \leq 0.92$.

Incidentally, if formula (3) given above is satisfied in respect of each of the negative electrode containing an alloy having a TiNiSi type crystal structure and the negative electrode containing an alloy having a ZrBeSi type crystal structure, it is possible to obtain a nonaqueous electrolyte secondary battery having a high discharge capacity per unit volume and excellent in the rate characteristics and the charge-discharge cycle life.

The binder used in the present invention includes, for example, polyvinylidene fluoride (PVdF), a fluorinated rubber, styrene-butadiene rubber (SBR) and carboxy methyl cellulose (CMC).

Concerning the mixing ratio of the negative electrode active material, the electrically conductive agent, and the binder, it is desirable for the negative electrode active material to be mixed in an amount of 90 to 99% by weight, for the electrically conductive agent to be mixed in an amount of 0 to 10% by weight, and for the binder to be mixed in an amount of 1 to 5% by weight.

The current collector used in the present invention is not particularly limited as long as the current collector is formed of an electrically conductive material. For example, it is possible for the current collector to be formed of a foil, a mesh, a punched metal or a lath metal of copper, stainless steel or nickel.

The nonaqueous electrolyte secondary battery according to the third embodiment of the present invention described above comprises a negative electrode containing an alloy having a $CeNiSi_2$ type crystal structure. In the case of using the negative electrode containing the alloy, an alloying reaction is not carried out between the alloy and lithium when lithium ions are interposed between the adjacent layers of the crystal in the charging stage of the secondary battery. Also, the interposed lithium ions are released from between the adjacent layers of the crystal in the discharge stage of the secondary battery. It follows that lithium can be intercalated into and deintercalated from between the adjacent layers of the crystal in the charge-discharge stages of the secondary battery without bringing about an alloying reaction between the alloy and lithium so as to enhance the reversibility of the intercalation/deintercalation reaction of lithium. In addition, since the volume expansion can be diminished at the interposing stage of lithium, it is possible to increase the stability of the crystal. What should also be noted is that it is possible to suppress the reaction between the negative electrode and the nonaqueous electrolyte. As a result, it is possible to increase the Coulomb efficiency during the charge-discharge cycle so as to achieve high charge-discharge cycle characteristics. The $CeNiSi_2$ type crystal structure of the alloy used in one embodiment of the present invention is featured in that two kinds of elements including the elements on the Ni site, e.g., at least one kind of element selected from the group consisting of Ti, V, Cr, Mn, Fe, Co, Ni, Cu, Zn and Nb, and the elements on the Si site, e.g., at least one kind of element selected from the group consisting of P, Si, Ge, Sn, and Sb, are arranged to form a hexagonal plane. In this case, the bonding between the adjacent atoms is considered to be stable, with the result that the element on the Si site, which is coupled with lithium in the charging stage, serves to suppress the collapse of the crystal structure when lithium is released from the crystal in the discharge stage. Also, since the elements on the Ni site and the Si site are arranged on a substantially single plane, it is possible to permit the diffusion of lithium to proceed smoothly within the crystal. It follows that, according to the secondary battery comprising a negative electrode containing an alloy having a CeNiSi$_2$ type crystal structure, it is possible to improve the charge-discharge cycle characteristics and to achieve a large discharge capacity even in the case where the current density or the C rate is increased.

It is possible to permit the absorption-desorption reaction of lithium to be carried out smoothly by controlling the lattice constant of the crystal axis "a" of the alloy having a CeNiSi$_2$ type crystal structure to fall within a range of 3.5 Å to 5.5 Å so as to further improve the rate characteristics.

Incidentally, the alloy having a TiNiSi type crystal structure makes it possible to perform the intercalation of lithium as described previously, with the result that it is possible to achieve a large discharge capacity per unit volume and excellent cycle characteristics. It is highly possible for the alloy of this type to achieve a high performance under a low current density or C rate. However, the capacity is unlikely to be exhibited sufficiently under a high current density. The problem is as follows. In the TiNiSi type crystal structure, the elements on the Ni site and the Si site are arranged zigzag, resulting in failure to secure sufficiently the lithium diffusion path inside the intermetallic compound when lithium is intercalated in the intermetallic compound by the charging. It follows that it is not possible for a high lithium diffusion rate to be obtained. Such being the situation, if the current density is increased in the charge-discharge stage in the secondary battery comprising a negative electrode containing an alloy having a TiNiSi type crystal structure, it is not possible for a sufficient capacity to be maintained.

Figure 3:
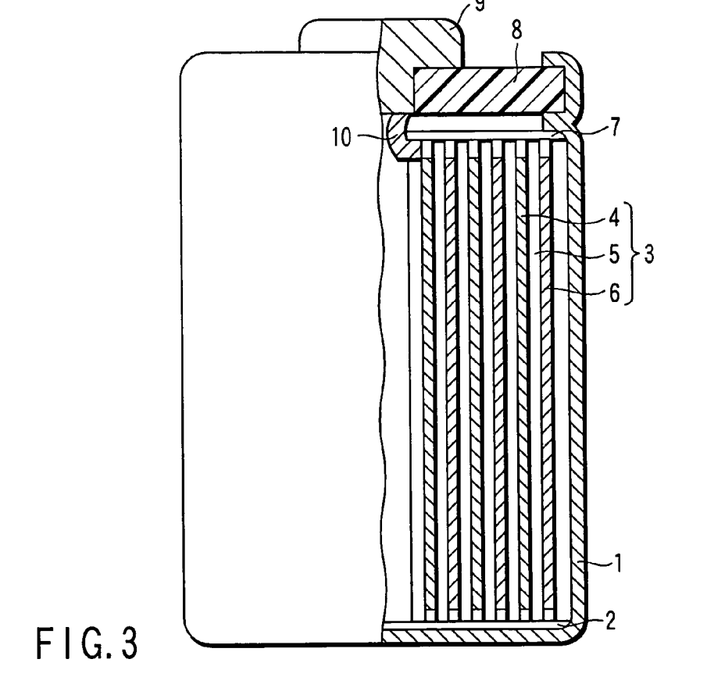
FIG. 3 is a cross sectional view schematically showing the construction of a cylindrical nonaqueous electrolyte secondary battery according to one embodiment of the nonaqueous electrolyte secondary battery of the present invention.

Each of the first to third embodiments according to the present invention can be applied to batteries of various shapes such as a cylindrical secondary battery, a secondary battery having a rectangular cross section, and a thin plate type secondary battery. FIG. 3 exemplifies the construction of the cylindrical nonaqueous electrolyte secondary battery, and FIG. 4 exemplifies the construction of the thin plate type nonaqueous electrolyte secondary battery.

As shown in FIG. 3, an insulating body 2 is arranged in the bottom portion of a cylindrical case 1 made of, for example, stainless steel and having a bottom. An electrode group 3 is housed in the case 1. The electrode group 3 is prepared by spirally winding a laminate structure comprising a positive electrode 4, a negative electrode 6 and a separator 5 interposed between the positive electrode 4 and the negative electrode 6.

A nonaqueous electrolysis solution is housed in the case 1. An insulating paper sheet 7 having a central open portion is arranged above the electrode group 3 within the case 1. An insulating sealing plate 8 is fixed by caulking to the upper open portion of the case 1. A positive electrode terminal 9 is fitted in the center of the insulating sealing plate 8. Further, a positive electrode lead 10 is electrically connected at one end to the positive electrode 4 and to the positive electrode terminal 9 at the other end. On the other hand, the negative electrode 6 is electrically connected to the case 1, which acts as a negative electrode terminal, via a negative electrode lead (not shown).

Figure 4:
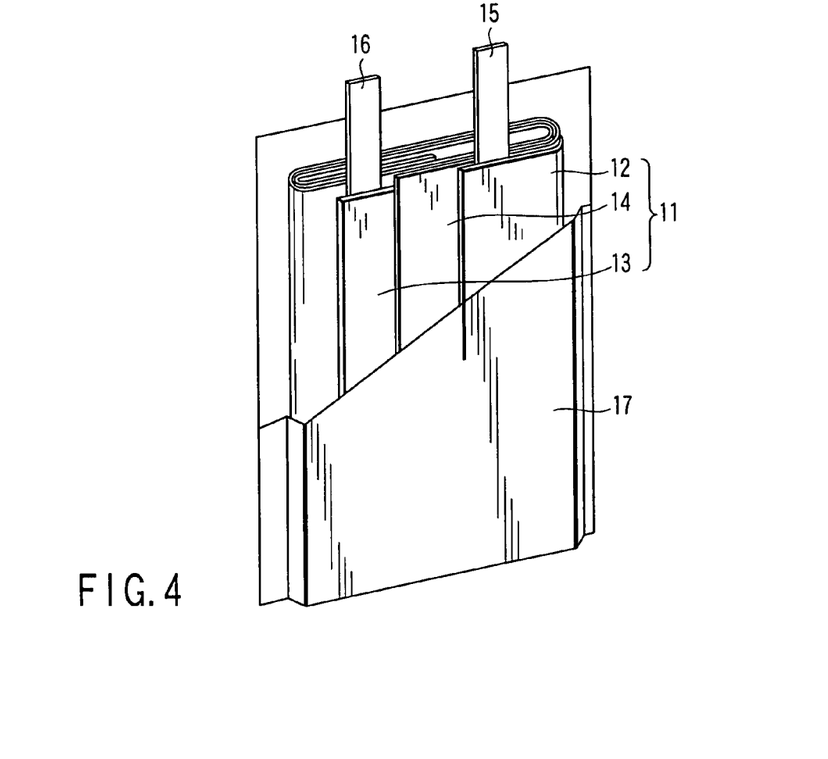
FIG. 4 is an oblique view, partly broken away, schematically showing the construction of a thin plate type nonaqueous electrolyte secondary battery according to another embodiment of the nonaqueous electrolyte secondary battery of the present invention.

The thin plate type nonaqueous electrolyte secondary battery shown in FIG. 4 comprises a flat plate type electrode group 11 prepared by spirally winding in a flattened shape a laminate structure including a positive electrode 12, a negative electrode 13, and a separator 14 interposed between the positive electrode 12 and the negative electrode 13. A band-like positive electrode terminal 15 is electrically connected to the positive electrode 12, and a band-like negative electrode terminal 16 is electrically connected to the negative electrode 13. The electrode group 11 is housed in a case 17 formed of a laminate film such that the edge portions of the positive electrode terminal 15 and the negative electrode terminal 16 protrude from within the case 17. The case 17 formed of a laminate film is sealed by means of a heat seal.

Incidentally, the shape of the electrode group housed in the case is not limited to the spiral shape as shown in FIG. 3 or to a flat plate shape as shown in FIG. 4. It is also possible to prepare the electrode group by laminating a positive electrode, a separator and a negative electrode in the order mentioned a plurality of times.

Examples of the present invention will now be described in detail with reference to the accompanying drawings.

EXAMPLES 1 TO 16

<Preparation of Positive Electrode>

In the first step, prepared was a positive electrode having an electrode density of 3.0 g/cm$^3$ by adding 2.5% by weight of an acetylene black, 3% by weight of graphite, 3.5% by weight of polyvinylidene fluoride (PVdF), and N-methylpyrrolidone (NMP) to 91% by weight of lithium cobalt oxide (LiCoO$_2$) powder used as a positive electrode active material while stirring the solution, followed by coating a current collector formed of an aluminum foil having a thickness of 15 μm with the resultant mixture and subsequently drying the coating and, then, pressing the coating.

<Preparation of Negative Electrode>

For preparation of a negative electrode active material, prescribed amounts of elements were mixed at the composition ratio shown in Table 1, followed by once casting the mixture in a thickness of about 10 mm on a water-cooled circular template by means of a induction heating and subsequently applying an additional induction heating to the cast mixture so as to obtain a melt. Then, the melt thus obtained was sprayed onto a cooling roll rotated at a speed of 40 m/s so as to obtain a flake-like intermetallic compound layer having a thickness of 10 to 30 μm, thereby obtaining a negative electrode active material.

In the next step, a negative electrode was prepared by adding 5% by weight of graphite used as an electrically conductive agent, 3% by weight of an acetylene black that was also used as an electrically conductive agent, 7% by weight of PVdF, and an NMP solution to 85% by weight of the intermetallic compound powder while stirring the solution, followed by coating a current collector formed of a copper foil having a thickness of 11 μm with the resultant mixture and subsequently drying the coating and, then, pressing the coating.

<Preparation of Electrode Group>

An electrode group was prepared by laminating the positive electrode noted above, a separator formed of a polyethylene porous film, the negative electrode noted above, and separator noted above in the order mentioned, followed by spirally winding the laminate structure such that the negative electrode is positioned to form the outermost circumferential surface.

<Preparation of Nonaqueous Electrolysis Solution>

Further, a nonaqueous electrolysis solution was prepared by dissolving lithium hexafluoro phosphate (LiPF$_6$) in a mixed solvent prepared by mixing ethylene carbonate (EC) with methyl ethyl carbonate (MEC) at a mixing ratio by volume of 1:2. Lithium hexafluoro phosphate was dissolved in the mixed solvent in an amount of 1 mol/L.

Finally, a cylindrical nonaqueous electrolyte secondary battery as shown in FIG. 1 was assembled by housing the electrode group and the nonaqueous electrolysis solution in a cylindrical case made of stainless steel and having a bottom.

EXAMPLE 17

A cylindrical nonaqueous electrolyte secondary battery was assembled as in Example 1, except that an intermetallic compound obtained by mixing prescribed amounts of elements having a composition ratio shown in Table 1, followed by casting the resultant mixture by means of a induction heating method and subsequently applying a heat treatment to the cast body at 900° C. for 6 hours under an inert gas atmosphere was used as the negative electrode active material.

The intermetallic compound used in the secondary battery for each of Examples 1 to 17 was analyzed by the X-ray diffraction method. It has been found that the intermetallic compound for each of Examples 1 to 16 contains a TiNiSi type crystal phase, and that the intermetallic compound for Example 17 contains a ZrBeSi type crystal phase. Also, the lattice constant of the crystal axis b of the TiNiSi type crystal and the lattice constant of the crystal axis "a" of the ZrBeSi type crystal were determined from the X-ray diffraction patterns, with the results as shown in Table 1.

COMPARATIVE EXAMPLE 1

A cylindrical nonaqueous electrolyte secondary battery was prepared as in Example 1, except that a Si powder having an average particle diameter of 10 µm was used as the negative electrode active material.

COMPARATIVE EXAMPLE 2

A cylindrical nonaqueous electrolyte secondary battery was prepared as in Example 1, except that a mesophase pitch based carbon fiber subjected to a heat treatment at 3250° C., and having an average fiber diameter of 10 µm, an average fiber length of 25 µm, an average layer spacing $d_{002}$ of 0.3355 nm, and a specific surface area as determined by the BET method of 3 m²/g was used as the negative electrode active material.

COMPARATIVE EXAMPLE 3

A cylindrical nonaqueous electrolyte secondary battery was prepared as in Example 1, except that a LiSn alloy was used as the negative electrode active material.

COMPARATIVE EXAMPLE 4

A cylindrical nonaqueous electrolyte secondary battery was prepared as in Example 1, except that an $FeSn_2$ alloy having a hexagonal close-packed structure and a $Ni_2In$ type structure was prepared by a roll quenching method and the alloy thus prepared was used as the negative electrode active material.

COMPARATIVE EXAMPLE 5

A cylindrical nonaqueous electrolyte secondary battery was prepared as in Example 1, except that a BeSiZr alloy having a hexagonal close-packed structure and a $Ni_2In$ type structure was prepared by a roll quenching method and the alloy thus prepared was used as the negative electrode active material.

COMPARATIVE EXAMPLE 6

A cylindrical nonaqueous electrolyte secondary battery was prepared as in Example 1, except that a CoSn alloy having a hexagonal close-packed structure was prepared by a roll quenching method and the alloy thus prepared was used as the negative electrode active material.

The secondary battery prepared in each of Examples 1 to 17 and Comparative Examples 1 to 6 was repeatedly subjected to a charge-discharge cycle in which the secondary battery was charged to 4.2V over 2 hours at 20° C. under a charging current of 1.5 A, followed by discharging the secondary battery to 2.7V under a discharge current of 1.5 A at 20° C., so as to measure the discharge capacity per unit volume. (mAh/cc) for the first cycle, and the capacity retention rate at the $100^{th}$ cycle. Tables 1 and 2 show the results. Incidentally, the capacity retention rate at the $100^{th}$ cycle was calculated on the basis that the discharge capacity at the first cycle was set at 100%.

TABLE 1

| | Composition of negative electrode active material | Crystal structure | Lattice constant (Å) | Discharge capacity per unit volume (mAh/cc) | Capacity retention rate at $100^{th}$ cycle (%) |
|---|---|---|---|---|---|
| Example 1 | $(La_{0.4}Ni_{0.6})_{40}Sn_{60}$ | TiNiSi type | 4.52 | 1680 | 84.3 |
| Example 2 | $(La_{0.4}Ni_{0.6})_{80}Sn_{20}$ | TiNiSi type | 4.37 | 985 | 85.3 |
| Example 3 | $(La_{0.7}Ni_{0.3})_{40}Sn_{60}$ | TiNiSi type | 4.94 | 2012 | 82.4 |
| Example 4 | $(La_{0.7}Ni_{0.3})_{80}Sn_{20}$ | TiNiSi type | 4.78 | 1822 | 86.2 |
| Example 5 | $(La_{0.54}Ni_{0.46})_{44}Sn_{56}$ | TiNiSi type | 4.73 | 1869 | 88.2 |
| Example 6 | $(Ba_{0.4}La_{0.2}Ni_{0.4})_{75}Sn_{25}$ | TiNiSi type | 5.46 | 1034 | 83.1 |
| Example 7 | $(Nd_{0.2}Ce_{0.2}Ni_{0.6})_{54}Sn_{46}$ | TiNiSi type | 4.62 | 1794 | 84.5 |
| Example 8 | $(Pr_{0.1}Y_{0.32}Ni_{0.58})_{72}Sn_{28}$ | TiNiSi type | 4.41 | 1012 | 93.5 |
| Example 9 | $(Mg_{0.53}Ni_{0.47})_{60}Sn_{40}$ | TiNiSi type | 4.03 | 1812 | 86.6 |
| Example 10 | $(Pm_{0.2}Hf_{0.1}Sm_{0.1}Ni_{0.6})_{54}Sn_{46}$ | TiNiSi type | 4.88 | 1725 | 85.2 |
| Example 11 | $(La_{0.4}Ba_{0.05}Ca_{0.05}Ni_{0.5})_{65}Sn_{35}$ | TiNiSi type | 5.13 | 1102 | 92.3 |
| Example 12 | $(La_{0.57}Nb_{0.04}Ni_{0.39})_{43}Sn_{57}$ | TiNiSi type | 4.88 | 1821 | 94.5 |
| Example 13 | $(La_{0.5}Co_{0.16}Ni_{0.34})_{44}Sn_{56}$ | TiNiSi type | 4.81 | 1692 | 96.1 |
| Example 14 | $(La_{0.6}Fe_{0.01}Ni_{0.39})_{65}Sn_{35}$ | TiNiSi type | 4.52 | 1103 | 94.3 |
| Example 15 | $(La_{0.5}Ti_{0.2}Ni_{0.3})_{44}Sn_{56}$ | TiNiSi type | 4.92 | 1854 | 91.3 |
| Example 16 | $(La_{0.52}V_{0.02}Ti_{0.06}Ni_{0.4})_{42}Sn_{58}$ | TiNiSi type | 4.82 | 1911 | 92.5 |
| Example 17 | $(La_{0.5}Ni_{0.5})_{66.7}Sn_{33.3}$ | ZrBeSi type | 4.65 | 1469.2 | 95.0 |

TABLE 2

|  | Composition of negative electrode active material | Crystal structure | Discharge capacity per unit volume (mAh/cc) | Capacity retention rate at 100th cycle (%) |
|---|---|---|---|---|
| Comparative Example 1 | Si | — | 9800 | 23 |
| Comparative Example 2 | C | — | 725.04 | 97 |
| Comparative Example 3 | Li—Sn alloy | — | 3254 | 12 |
| Comparative Example 4 | $FeSn_2$ | $Ni_2In$ type | 1743 | 32 |
| Comparative Example 5 | BeSiZr | $Ni_2In$ type | 1320 | 54 |
| Comparative Example 6 | CoSn | CoSn type | 2830 | 43 |

As apparent from Tables 1 and 2, the discharge capacity per unit volume of the secondary battery for each of Examples 1 to 17 comprising the negative electrode containing an intermetallic compound having a TiNiSi type or ZrBeSi type crystal structure was found to be higher than that for the secondary battery for Comparative Example 2 using a carbonaceous material. Also, the capacity retention rate at the $100^{th}$ cycle for the secondary battery for each of Examples 1 to 17 was found to be higher than that for the secondary battery for each of Comparative Examples 1 and 3 to 6.

Figure 5:
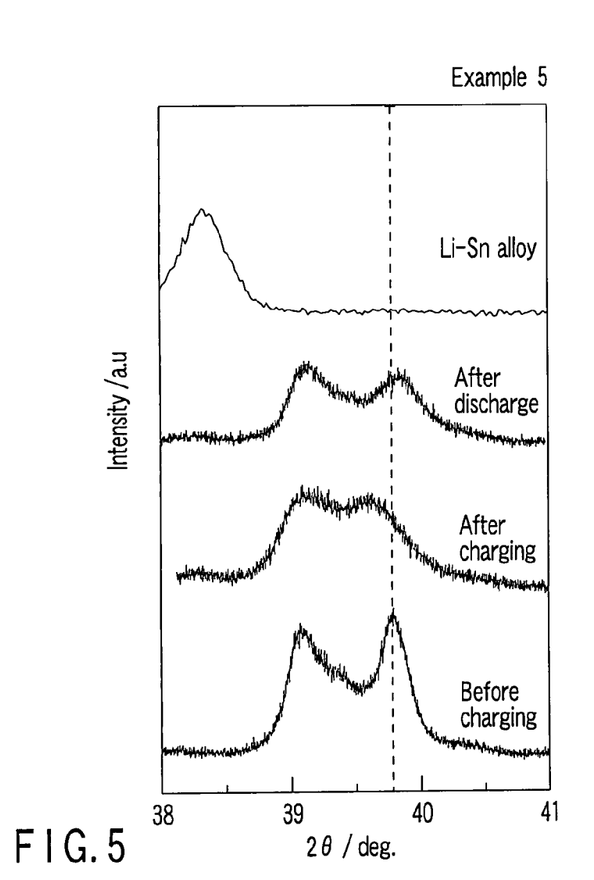
FIG. 5 is a graph showing the X-ray diffraction patterns of the negative electrode active material under the initial state, the charged state and the discharged state in respect of the nonaqueous electrolyte secondary battery for Example 5 and the X-ray diffraction pattern of the negative electrode active material under the charged state in respect of the nonaqueous electrolyte secondary battery for Comparative Example 3.
Figure 6:
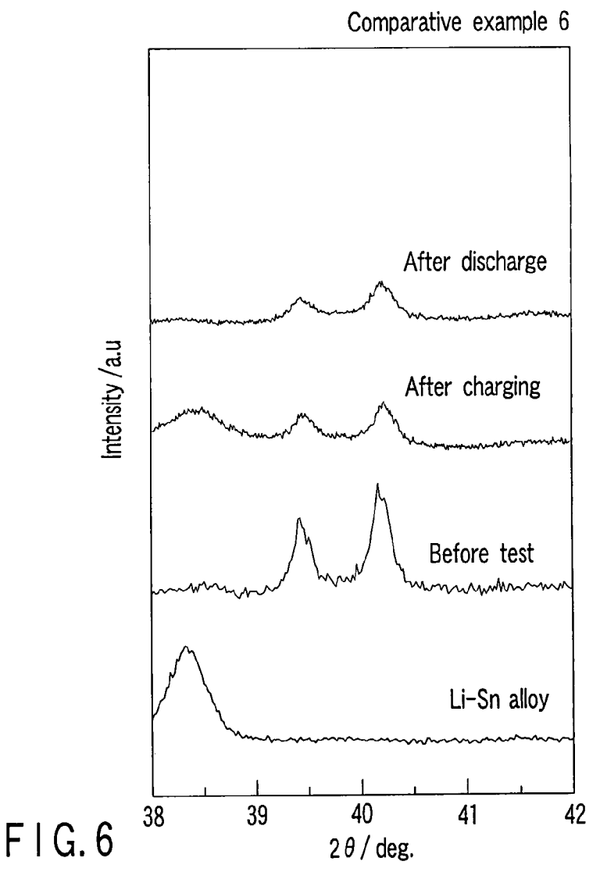
FIG. 6 is a graph showing the X-ray diffraction patterns of the negative electrode active material under the initial state (before the test), the charged state and the discharged state in respect of the nonaqueous electrolyte secondary battery for Comparative Example 6 and the X-ray diffraction pattern of the negative electrode active material under the charged state in respect of the nonaqueous electrolyte secondary battery for Comparative Example 3.

FIG. 5 shows the X-ray diffraction patterns of the negative electrode active material under the initial state (before the charging), the charged state and the discharged state in respect of the secondary battery for Example 5 in which $(La_{0.54}Ni_{0.46})_{44}Sn_{56}$ intermetallic compound was used as the negative electrode active material. FIG. 5 shows the peaks derived from the TiNiSi type crystal structure. FIG. 5 also shows the X-ray diffraction pattern of the negative electrode active material under the charged state of the secondary battery for Comparative Example 3 in which a LiSn alloy was used as the negative electrode active material. On the other hand, FIG. 6 shows the X-ray diffraction patterns of the negative electrode active material under the initial state (before the charging or before the test), the charged state and the discharged state in respect of the secondary battery for Comparative Example 6 in which a CoSn alloy was used as the negative electrode active material. FIG. 6 also shows the X-ray diffraction pattern of the negative electrode active material under the charged state of the secondary battery for Comparative Example 3 in which a LiSn alloy was used as the negative electrode active material.

As apparent from FIG. 5, the diffraction peak at about 39.8° is shifted toward the smaller angle side after the charging in the secondary battery for Example 5, supporting that lithium was intercalated in the charging stage into the intermetallic compound having the TiNiSi type crystal structure. Also, as apparent from the diffraction pattern after the discharge, the shifted diffraction peak was brought back to the original peak position after the discharge. This indicates that the crystal was shrunk while maintaining the skeletal structure of the lattice.

On the other hand, the diffraction pattern was not shifted in the secondary battery for Comparative Example 6. However, a peak derived from the alloying reaction between Li and Sn was observed in the vicinity of 38.3° in the diffraction pattern after the charging, as shown in FIG. 6. The diffraction peak disappears after the discharge. However, it is known to the art that the generation of the LiSn alloy in the charge-discharge stage brings about a vigorous change in the volume of the alloy active material. It follows that the fine pulverization of the active material causes a deterioration of the charge-discharge cycle. In other words, it is of no difficulty to understand that the intercalation/deintercalation reaction of lithium is reversibly carried out in the secondary battery for Example 5, and that the change in volume of the intermetallic compound accompanying the intercalation/deintercalation reaction of lithium is small.

Figure 7:
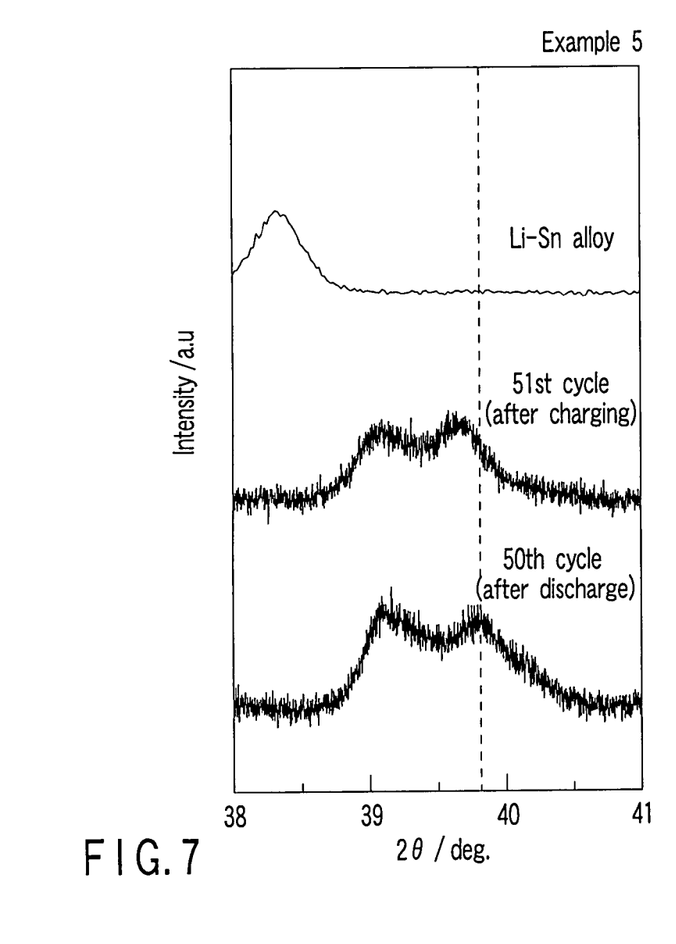
FIG. 7 is a graph showing the X-ray diffraction patterns of the negative electrode active material after the discharge in the $50^{th}$ cycle and after the charging in the $51^{st}$ cycle in respect of the nonaqueous electrolyte secondary battery for Example 5 and the X-ray diffraction pattern of the negative electrode active material under the charged state in respect of the nonaqueous electrolyte secondary battery for Comparative Example 3.
Figure 8:
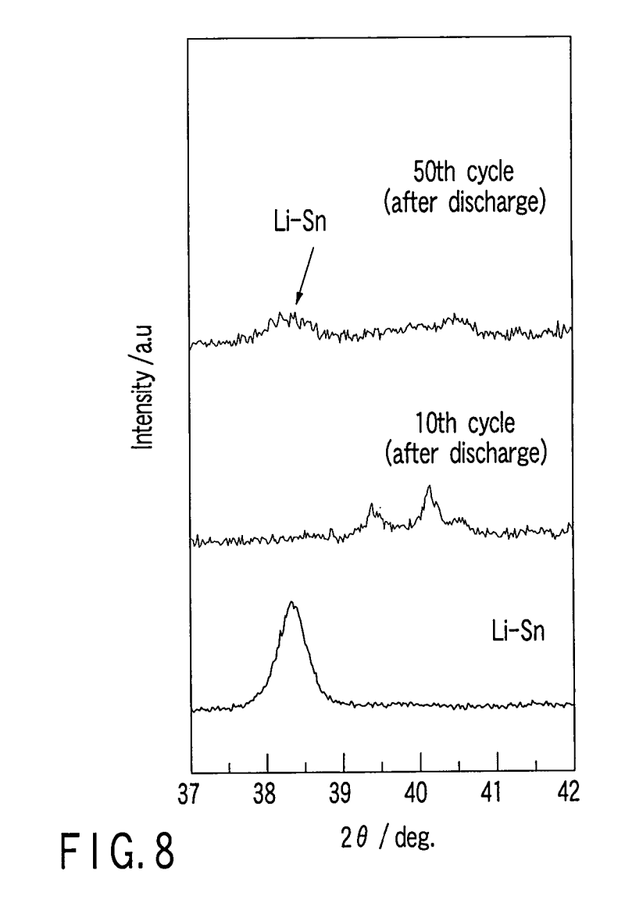
FIG. 8 is a graph showing the X-ray diffraction patterns of the negative electrode active material after the discharge in the $10^{th}$ cycle and in the $50^{th}$ cycle in respect of the nonaqueous electrolyte secondary battery for Comparative Example 6 and the X-ray diffraction pattern of the negative electrode active material under the charged state in respect of the nonaqueous electrolyte secondary battery for Comparative Example 3.

Even if the secondary battery for Example 5 was subjected to 50 charge-discharge cycles, a peak in the vicinity of 38.3° derived from the alloying reaction between Li and Sn was not recognized in the diffraction pattern after discharge for the $50^{th}$ cycle and after the charging in the $51^{st}$ cycle as shown in FIG. 7. On the other hand, a peak in the vicinity of 38.3°, which is derived from the alloying reaction between Li and Sn, was not recognized in the diffraction pattern under the state after the discharge in the tenth cycle of the charge-discharge operation, when it comes to the secondary battery for Comparative Example 6, as apparent from FIG. 8. However, the peak noted above was clearly observed in the diffraction pattern under the state after the discharge in the $50^{th}$ cycle of the charge-discharge operation. The experimental data suggest that the alloying reaction between Li and Sn takes place in the charging stage as in Comparative Example 6 because Li is stored in the alloy as an irreversible capacity by the repetition of the charge-discharge operation, which shortens the charge-discharge cycle life.

EXAMPLES 18 TO 31

<Preparation of Positive Electrode>

In the first step, prepared was a positive electrode having an electrode density of 3.0 g/cm³ by adding 2.5% by weight of an acetylene black, 3% by weight of graphite, 3.5% by weight of polyvinylidene fluoride (PVdF), and N-methylpyrrolidone (NMP) to 91% by weight of lithium cobalt oxide ($LiCoO_2$) powder used as a positive electrode active material while stirring the solution so as to obtain a slurry, followed by coating a current-collector formed of an aluminum foil having a thickness of 15 μm with the resultant slurry and subsequently drying the coating and, then, pressing the coating.

<Preparation of Negative Electrode>

For preparation of a negative electrode active material, prescribed amounts of elements were mixed at the composition ratio shown in Table 3, and the mixture was subjected to induction heating, thus obtaining a melt. Thus obtained melt was then pour onto a rotating cooling plate to solidify it. The cooling rate here was set to $10^3$ (K/s). After the casting, the resultant was subjected to a heat treatment at a temperature of 900° C. for 6 hours under an inert gas atmosphere, and thus an intermetallic compound was obtained. The true density ρ of the intermetallic compound thus obtained was found to be 7.25 g/cm³ as measured by the Archimedean method.

In the next step, a negative electrode was prepared by adding 4% by weight of graphite used as an electrically conductive agent, 2% by weight of PVdF, and an NMP solution to 94% by weight of the inter-metallic compound powder while stirring the solution so as to obtain a slurry, followed by coating a current collector formed of a copper foil having a thickness of 11 μm with the resultant slurry and subsequently drying the coating and, then, pressing the coating such that the negative electrode thus prepared had a weight w per unit area of 180 g/m² and a thickness d of 41.4 μm. In other words, the negative electrode thus prepared had a ratio (w/d)/ρ of 0.6.

<Preparation of Electrode Group>

An electrode group was prepared by laminating the positive electrode noted above, a separator formed of a polyethylene porous film, the negative electrode noted above, and the separator noted above in the order mentioned, followed by spirally winding the laminate structure such that the negative electrode was positioned to form the outermost circumferential surface.

<Preparation of Nonaqueous Electrolysis Solution>

Further, a nonaqueous electrolysis solution was prepared by dissolving lithium hexafluoro phosphate ($LiPF_6$) in a mixed solvent prepared by mixing ethylene carbonate (EC) with methyl ethyl carbonate (MEC) at a mixing ratio by volume of 1:2. Lithium hexafluoro phosphate was dissolved in the mixed solvent in an amount of 1 mol/L.

Finally, a cylindrical nonaqueous electrolyte secondary battery as shown in FIG. 1 was assembled by housing the electrode group and the nonaqueous electrolysis solution in a cylindrical case made of stainless steel and having a bottom.

The intermetallic compound used in the secondary battery for each of Examples 18 and 31 was analyzed by an X-ray diffraction method. It has been confirmed that the intermetallic compound used in the secondary battery for each of Examples 18 to 31 contains a $CeNiSi_2$ type crystal phase. Also, the lattice constant of the crystal axis "a" of the $CeNiSi_2$ type crystal was determined from the X-ray diffraction pattern. Table 3 shows the results.

fiber length of 25 μm, an average layer spacing $d_{002}$ of 0.3355 nm, and a specific surface area as determined by the BET method of 3 $m^2$/g was used as the negative electrode active material.

COMPARATIVE EXAMPLE 9

A cylindrical nonaqueous electrolyte secondary battery was prepared as in Example 18, except that a LiSn alloy was used as the negative electrode active material.

The secondary battery prepared in each of Examples 18 to 31 and Comparative Examples 7 to 9 was repeatedly subjected to a charge-discharge cycle in which the secondary battery was charged to 4.2V over 2 hours at 15° C. under a charging current of 1 A, followed by discharging the secondary battery to 2.5V under a discharge current of 1 A at 15° C., so as to measure the discharge capacity per unit volume (mAh/cc) for the first cycle. Then, the capacity retention rate at the $50^{th}$ cycle was measured at 15° C. Table 3 shows the capacity retention rate that was obtained by the calculation on the basis that the discharge capacity at the first cycle was set at 100%. Also, the secondary battery was charged to 4.2V over 2 hours at 15° C. under the charging current of 1 A, followed by discharging the secondary battery to 2.5V under the discharge current of 5 A. Then, the discharge capacity retention rate during the discharge at 5A was calculated on the basis that the discharge capacity during the discharge at 1 A was set at 100%. Table 3 shows the results.

TABLE 3

| | Composition of negative electrode active material | Lattice constant of crystal axis "a" (Å) | Discharge capacity per unit volume (mAh/cc) | Capacity retention rate of 5A discharge (%) | Capacity retention rate at $50^{th}$ cycle (%) |
|---|---|---|---|---|---|
| Example 18 | $LaNi_{0.5}Sn_{1.5}$ | 4.12 | 1023 | 75.9 | 88.5 |
| Example 19 | $LaNi_{0.5}Sn_{3.5}$ | 4.35 | 1832 | 77.5 | 78.5 |
| Example 20 | $LaNi_{1.5}Sn_{1.5}$ | 4.98 | 835 | 81.5 | 89.5 |
| Example 21 | $LaNi_{1.5}Sn_{3.5}$ | 5.02 | 1635 | 82.3 | 83.3 |
| Example 22 | $LaNi_{0.8}Sn_2$ | 4.56 | 1543 | 79.9 | 85.5 |
| Example 23 | $CeNi_{0.7}Si_2$ | 4.28 | 1325 | 76.7 | 85.3 |
| Example 24 | $(La_{0.5}Ca_{0.5})(Ni_{0.5}Co_{0.3})Sn_2$ | 5.03 | 1635 | 83.5 | 83.2 |
| Example 25 | $(Zr_{0.5}Ce_{0.5})(Ni_{1.2}Fe_{0.3})Ge_3$ | 3.86 | 1536 | 71.5 | 82.1 |
| Example 26 | $(La_{0.7}Ba_{0.3})(Ni_{0.5}Co_{0.3})Sn_2$ | 5.21 | 1338 | 84.3 | 83.5 |
| Example 27 | $(La_{0.7}Mg_{0.3})(Ni_{1.0}Ti_{0.3})(Sn_2P_{0.2})$ | 4.83 | 1476 | 80.7 | 80.5 |
| Example 28 | $La(Ni_{0.3}Ti_{0.3}V_{0.3})(Si_2Sb_{0.1})$ | 4.05 | 1225 | 75.1 | 86.5 |
| Example 29 | $La(Ni_{0.8}Cr_{0.3})Sn_{2.3}$ | 4.53 | 1469 | 78.3 | 83.1 |
| Example 30 | $Ce(Ni_{0.2}Mn_{0.3})Si_{1.8}$ | 3.98 | 1054 | 73.2 | 86.7 |
| Example 31 | $(Ce_{0.3}Sr_{0.7})(Ni_{0.5}Zn_{0.1}Nb_{0.1})Sn_{2.3}$ | 4.53 | 1224 | 79.1 | 83.5 |
| Comparative Example 7 | Si | — | 9800 | 45.2 | 23 |
| Comparative Example 8 | C | — | 725 | 56.1 | 98 |
| Comparative Example 9 | Li—Sn alloy | — | 3254 | 63.1 | 45 |

COMPARATIVE EXAMPLE 7

A cylindrical nonaqueous electrolyte secondary battery was prepared as in Example 18, except that a Si powder having an average particle diameter of 10 μm was used as the negative electrode active material.

COMPARATIVE EXAMPLE 8

A cylindrical nonaqueous electrolyte secondary battery was prepared as in Example 18, except that a mesophase pitch based carbon fiber subjected to a heat treatment at 3250° C., and having an average fiber diameter of 10 μm, an average To reiterate, the secondary battery for each of Examples 18 to 31 comprised a negative electrode containing an intermetallic compound having a $CeNiSi_2$ type crystal structure. As apparent from Table 3, the secondary battery for each of these Examples exhibited a discharge capacity per unit volume larger than that for the secondary battery for Comparative Example 8 comprising a negative electrode containing a carbonaceous material. The secondary battery for each of the Examples of the present invention also exhibited the rate characteristics (capacity retention rate during the discharge under 5 A of the discharge current) and the charge-discharge cycle characteristics (capacity retention rate at the $50^{th}$ charge-discharge cycle), which were superior to those for the secondary battery for each of Comparative Examples 7 to 9.

Figure 10:
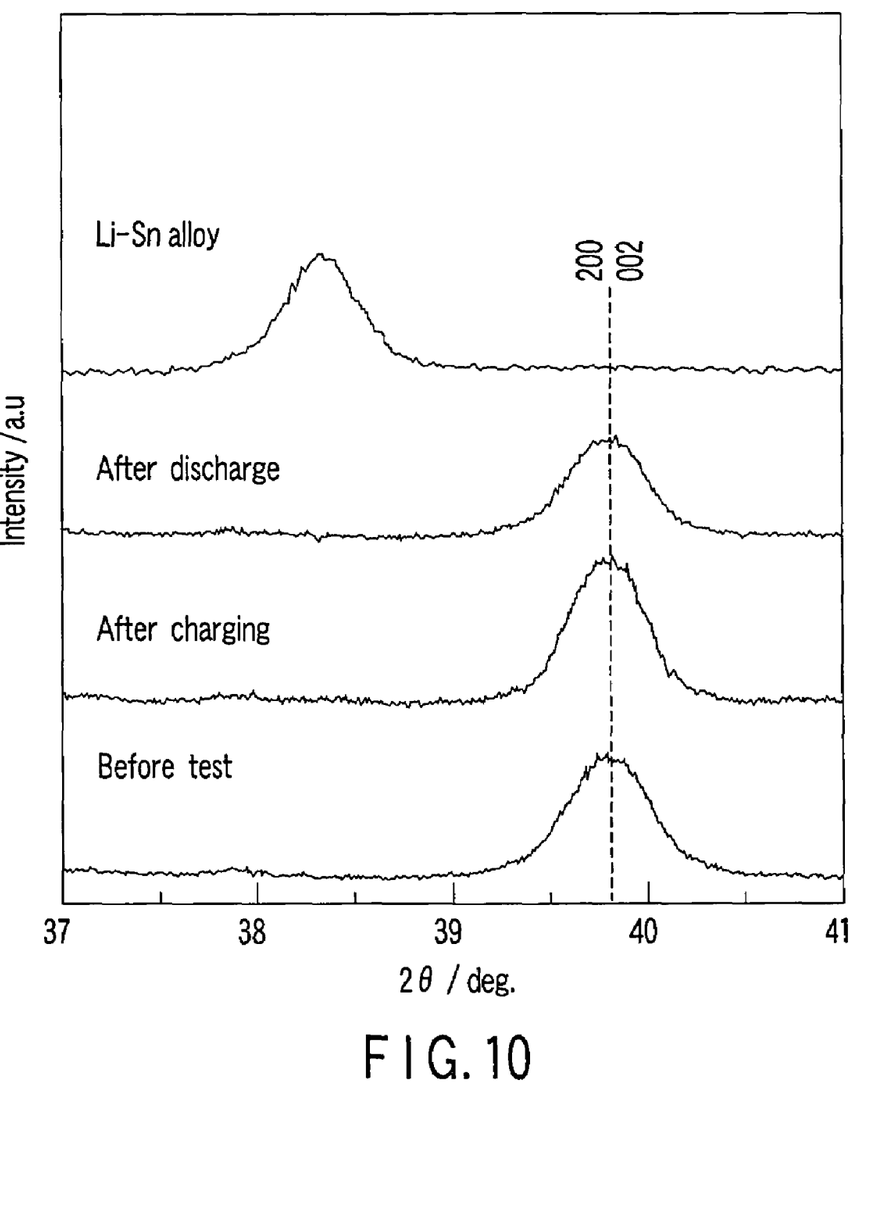
FIG. 10 is a graph showing the X-ray diffraction patterns of the negative electrode active material under the initial state, the charged state and the discharged state in respect of the nonaqueous electrolyte secondary battery for Example 22.

FIG. 10 shows the X-ray diffraction patterns of the negative electrode active material under the initial state before the charging, the charged state and the discharged state in respect of the secondary battery for Example 22. To be more specific, the peaks for the (200) plane and the (002) plane are shown in FIG. 10. In the secondary battery for Example 22, both of the (200) plane diffraction peak and the (002) plane diffraction peak were scarcely shifted after the charging, and the peak derived from the presence of the LiSn alloy was not observed. Also, a significant change was not observed in the diffraction peaks on the (200) plane and the (002) plane after the discharge. The experimental data clearly support that the volume expansion scarcely occurred and the skeletal structure of the lattice was maintained. In other words, it can be understood that the intercalation/deintercalation reaction of lithium is reversibly carried out, and that the intercalation/deintercalation reaction of lithium is not accompanied by the change in volume of the intermetallic compound. Such being the situation, the secondary battery for each of Examples 18 to 31 was capable of achieving a large capacity per unit volume and a long charge-discharge cycle life.

Incidentally, a cylindrical nonaqueous electrolyte secondary battery for Example 32 was manufactured substantially as in Example 18, except that a $(La_{0.54}Ni_{0.46})_{44}Sn_{56}$ alloy having a hexagonal close-packed structure and a TiNiSi type crystal structure was prepared by a roll quenching method and used as a negative electrode active material. The discharge capacity per unit volume, the capacity retention rate during the discharge under the discharge current of 5 A, and the capacity retention rate at the $50^{th}$ charge-discharge cycle for the secondary battery for Example 32 were measured as in Example 18. The discharge capacity per unit volume was found to be 1243 mA/cc. The capacity retention rate during the discharge under the discharge current of 5 A was found to be 34.5%. Further, the capacity retention rate at the $50^{th}$ charge-discharge cycle was found to be 88.5%.

EXAMPLE 33

<Manufacture of Negative Electrode>

A negative electrode was prepared by adding a graphite powder, PVdF, and an NMP solution to the intermetallic compound powder of the same kind as that for Example 22 in accordance with the mixing ratio shown in Table 4 while stirring the solution so as to obtain a slurry, followed by coating a current collector formed of a copper foil having a thickness of 12 μm with the resultant slurry and subsequently drying the coating and, then, pressing the coating such that the negative electrode thus prepared had a weight w per unit area of 200 g/m$^2$ and a thickness d of 46 μm. In other words, the negative electrode thus prepared had a ratio (w/d)/ρ of 0.6.

Incidentally, the true density p of the inter-metallic compound used was measured by the Archimedean method by using water under an atmosphere of room temperature (23° C.).

Further, a cylindrical nonaqueous electrolyte secondary battery was manufactured as in Example 18, except that the negative electrode prepared as described above was used for manufacturing the secondary battery.

EXAMPLE 34

<Manufacture of Negative Electrode>

A negative electrode was prepared by adding a graphite powder, PVdF, and an NMP solution to the intermetallic compound powder of the same kind as that for Example 22 in accordance with the mixing ratio shown in Table 4 while stirring the solution so as to obtain a slurry, followed by coating a current collector formed of a copper foil having a thickness of 12 μm with the resultant slurry and subsequently drying the coating and, then, pressing the coating such that the negative electrode thus prepared had a weight w per unit area of 200 g/m$^2$ and a thickness d of 34.5 μm. In other words, the negative electrode thus prepared had a ratio (w/d)/ρ of 0.8.

Further, a cylindrical nonaqueous electrolyte secondary battery was manufactured as in Example 18, except that the negative electrode prepared as described above was used for manufacturing the secondary battery.

EXAMPLE 35

An intermetallic compound powder of the same kind as that used in Example 22 was molded into a pellet having a diameter of 1 cm, and a coin-shaped nonaqueous electrolyte secondary battery was assembled by using the molded pellet as the negative electrode.

EXAMPLE 36

<Manufacture of Negative Electrode>

A negative electrode was prepared by adding a graphite powder, PVdF, and an NMP solution to the intermetallic compound powder of the same kind as that for Example 22 in accordance with the mixing ratio shown in Table 4 while stirring the solution so as to obtain a slurry, followed by coating a current collector formed of a copper foil having a thickness of 12 μm with the resultant slurry and subsequently drying the coating and, then, pressing the coating such that the negative electrode thus prepared had a weight w per unit area of 200 g/m$^2$ and a thickness d of 92.0 μm. In other words, the negative electrode thus prepared had a ratio (w/d)/ρ of 0.3.

Further, a cylindrical nonaqueous electrolyte secondary-battery was manufactured as in Example 18, except that the negative electrode prepared as described above was used for manufacturing the secondary battery.

The secondary battery manufactured in each of Examples 33 to 36 was subjected to a charge-discharge cycle test in which the secondary battery was charged for 3 hours to 4.2V under the charging current of 1 C with the measuring environment temperature set at 35° C., followed by discharging the secondary battery to 3.0V at the discharge current of 1 C, so as to measure the negative electrode initial capacity per unit volume and the capacity retention rate when the charge-discharge cycle was repeated 50 times. The capacity retention rate denotes the capacity at the $50^{th}$ cycle on the basis that the capacity at the first cycle was set at 100. Also conducted under the same environment was an additional charge-discharge cycle test in which the secondary battery was charged for 3 hours to 4.2V with the charging current of 1 C, followed by discharging the secondary battery to 3.0V with the discharge current of 3 C. Then, the capacity retention rate after the discharge with the discharge current of 3 C was obtained from the 3C discharge capacity on the basis that the 1 C discharge capacity was set at 100%. Table 4 shows the results.

TABLE 4

|  | Alloy composition | True density ρ of alloy (g/cm³) | PVdF ratio in negative electrode (wt %) | Graphite ratio in negative electrode (wt %) | (w/d)/ρ | Discharge capacity per unit volume (mAh/cc) | Capacity retention rate of 3 C discharge (%) | Capacity retention rate at 50th cycle (%) |
|---|---|---|---|---|---|---|---|---|
| Example 33 | LaNi$_{0.8}$Sn$_2$ | 7.25 | 2 | 8 | 0.6 | 1543 | 76.5 | 85.5 |
| Example 34 | LaNi$_{0.8}$Sn$_2$ | 7.25 | 2 | 3 | 0.8 | 1654 | 73.2 | 83.2 |
| Example 35 | LaNi$_{0.8}$Sn$_2$ (pellet type) | 7.25 | No addition | No addition | 1 | 1690 | 23.5 | 73.2 |
| Example 36 | LaNi$_{0.8}$Sn$_2$ | 7.25 | 5 | 25 | 0.3 | 763 | 83.2 | 89.3 |

As apparent from Table 4, the secondary battery for each of Examples 33 and 34, which included a negative electrode having a ratio (w/d)/ρ falling with a range of 0.55 to 0.95, made it possible to improve the discharge capacity per unit volume while maintaining a high capacity retention rate during the discharge at 3 C and a high capacity retention rate at the 50$^{th}$ charge-discharge cycle.

On the other hand, it is considered reasonable to understand that, in the secondary battery for Example 35 including a negative electrode having a ratio (w/d)/ρ of 1, the electrolysis solution failed to permeate sufficiently into the negative electrode and, thus, the charge-discharge reaction rate was slower than the C rate when the C rate was increased, resulting in failure to obtain a sufficiently high capacity retention rate during the discharge at 3 C. Also, the secondary battery for Example 36 including a negative electrode having a ratio (w/d)/ρ of 0.3 exhibited a sufficiently high capacity retention rate during the discharge at 3 C and a sufficiently high capacity retention rate at the 50$^{th}$ charge-discharge cycle and was superior to the secondary battery for Comparative Example 8 (carbonaceous material) in the discharge capacity per unit volume. However, the secondary battery for Example 36 was somewhat insufficient in the discharge capacity per unit volume, compared with the secondary battery for each of Examples 33 and 34.

The experimental data support that a secondary battery having a large capacity and stable cycle characteristics and sufficiently satisfying the rate characteristics can be obtained by setting the ratio (w/d)/ρ to fall within a range of 0.55 to 0.95.

As described above in detail, the present invention provides a nonaqueous electrolyte secondary battery having a large discharge capacity per unit volume and a sufficiently long charge-discharge cycle life.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A nonaqueous electrolyte secondary battery comprising:
   a positive electrode;
   a negative electrode including an alloy having a CeNiSi$_2$ type crystal structure; and
   a nonaqueous electrolyte,
   wherein the alloy is made of a ternary alloy system that has a composition represented by a formula

LnM1$_x$M2$_y$ where Ln denotes at least one kind of element selected from the elements having an atomic radius falling within a range of 1.6×10$^{-10}$ m to 2.2×10$^{-10}$ m, M1 is at least one element selected from the group consisting of Ti, V, Cr, Mn, Fe, Co, Ni, Cu, Zn, and Nb, M2 is at least one element selected from the group consisting of P, Si, Ge, Sn and Sb, and x and y satisfy the conditions of 0.5≦x≦1.5 and 1.5≦y≦3.5.

2. The nonaqueous electrolyte secondary battery according to claim 1,
   wherein a lattice constant of crystal axis "a" of the CeNiSi$_2$ type crystal structure falls within a range of 3.5 Å to 5.5 Å.

3. The nonaqueous electrolyte secondary battery according to claim 2,
   wherein said lattice constant falls within a range of 4 Å to 5 Å.

4. The nonaqueous electrolyte secondary battery according to claim 1, wherein the element Ln is at least one element selected from the group consisting of La, Ce, Pr, Nd, Pm, Sm, Mg, Ca, Sr, Ba, Y, Zr and Hf.

5. The nonaqueous electrolyte secondary battery according to claim 1, wherein the atomic ratio x satisfies 0.6≦x≦1.3.

6. The nonaqueous electrolyte secondary battery according to claim 1, wherein the atomic ratio y satisfies 1.7≦y≦2.5.

7. The nonaqueous electrolyte secondary battery according to claim 1, wherein the negative electrode satisfies a formula:

0.95≦(w/d)/ρ≦0.55 where ρ denotes a true density (g/cm³) of the alloy, d denotes a thickness (μm) of the negative electrode, and w denotes a weight per unit area (g/m²) of the negative electrode.

8. The nonaqueous electrolyte secondary battery according to claim 1, wherein the alloy is a single phase alloy or a polyphase alloy.

* * * * *